United States Patent
Xu et al.

(10) Patent No.: US 11,095,832 B2
(45) Date of Patent: Aug. 17, 2021

(54) METHOD AND SYSTEM OF FAST IMAGE BLENDING FOR OVERLAPPING REGION IN SURROUND VIEW

(71) Applicant: Harman International Industries, Incorporated, Stamford, CT (US)

(72) Inventors: Min Xu, Shanghai (CN); Qingshan Zhang, Shanghai (CN)

(73) Assignee: HARMAN INTERNATIONAL INDUSTRIES INCORPORATED, Stamford, CT (US)

( * ) Notice: Subject to any disclaimer, the term of this patent is extended or adjusted under 35 U.S.C. 154(b) by 0 days.

(21) Appl. No.: 16/753,742

(22) PCT Filed: Oct. 26, 2017

(86) PCT No.: PCT/CN2017/107803
§ 371 (c)(1),
(2) Date: Apr. 3, 2020

(87) PCT Pub. No.: WO2019/080043
PCT Pub. Date: May 2, 2019

(65) Prior Publication Data
US 2020/0280684 A1   Sep. 3, 2020

(51) Int. Cl.
*H04N 5/265* (2006.01)
*B60R 1/00* (2006.01)
(Continued)

(52) U.S. Cl.
CPC ............. *H04N 5/265* (2013.01); *B60R 1/00* (2013.01); *H04N 5/23238* (2013.01);
(Continued)

(58) Field of Classification Search
CPC ............ B60R 1/00; B60R 2300/105; B60R 2300/303; B60R 2300/607; G06T 3/4038; H04N 5/23238; H04N 5/247; H04N 5/265
See application file for complete search history.

(56) References Cited

U.S. PATENT DOCUMENTS

2009/0169102 A1\*  7/2009  Zhang ............... H04N 5/3653
                                                             382/167
2014/0152827 A1   6/2014  Yamamoto et al.
(Continued)

FOREIGN PATENT DOCUMENTS

CN    102142138 A    8/2011
CN    102521817 A    6/2012
(Continued)

OTHER PUBLICATIONS

ISA State Intellectual Property Office of the People's Republic of China, International Search Report and Written Opinion Issued in Application No. PCT/CN2017/107803, dated Jul. 11, 2018, WIPO, 9 pages.
(Continued)

*Primary Examiner* — Reza Aghevli
(74) *Attorney, Agent, or Firm* — McCoy Russell LLP (57) ABSTRACT

A system and a method for processing an overlapping region in a surround view. The system includes a plurality of cameras for capturing images; a processor configured to determine whether a point in a bird's-eye view image obtained from the captured images is located in an overlapping region; and upon the condition that the point is located in the overlapping region, retrieve a blending mask corresponding to the coordinate of the point, and determine a new pixel value of the point according to the blending mask and one or more original pixel values of the point. The described
(Continued)

methods provide a solution which fast blends the overlapping regions in a surround view with low computational complexity.

14 Claims, 7 Drawing Sheets (51) Int. Cl.
H04N 5/247 (2006.01)
H04N 5/232 (2006.01)

(52) U.S. Cl.
CPC ........ *H04N 5/247* (2013.01); *B60R 2300/105* (2013.01); *B60R 2300/303* (2013.01); *B60R 2300/607* (2013.01)

(56) References Cited

U.S. PATENT DOCUMENTS

| | | |
|---|---|---|
| 2015/0302561 A1 | 10/2015 | Pekkucuksen et al. |
| 2016/0269717 A1* | 9/2016 | Kato ................... H04N 13/239 |
| 2017/0064203 A1* | 3/2017 | Kikuta ................. G06T 3/4038 |
| 2017/0132762 A1* | 5/2017 | Zhou .................... G06T 3/4038 |
| 2017/0236305 A1* | 8/2017 | Staudenmaier ......... G06T 7/521 348/148 |
| 2017/0287200 A1* | 10/2017 | Forutanpour ............. G06T 1/20 |
| 2018/0268521 A1* | 9/2018 | Ding .................... G06K 9/6212 |
| 2018/0357804 A1* | 12/2018 | Forutanpour .......... H04N 5/247 |
| 2019/0108615 A1* | 4/2019 | Bartels ..................... G06T 5/50 |
| 2020/0020075 A1* | 1/2020 | Khwaja ................ G06T 3/4038 |

FOREIGN PATENT DOCUMENTS

| | | |
|---|---|---|
| CN | 102642501 A | 8/2012 |
| CN | 103366339 A | 10/2013 |
| JP | 2011013890 A | 1/2011 |

OTHER PUBLICATIONS

European Patent Office, Extended European Search Report Issued in Application No. 17930063.7, dated May 7, 2021, Germany, 11 pages.

* cited by examiner

METHOD AND SYSTEM OF FAST IMAGE BLENDING FOR OVERLAPPING REGION IN SURROUND VIEW

CROSS-REFERENCE TO RELATED APPLICATIONS

The present application is a U.S. National Phase of International Patent Application Serial No. PCT/CN2017/107803 entitled "METHOD AND SYSTEM OF FAST IMAGE BLENDING FOR OVERLAPPING REGIONS IN SURROUND VIEW," filed on Oct. 26, 2017. The entire contents of the above-listed application is hereby incorporated by reference for all purposes.

FIELD

The present disclosure relates to a surround view processing, and more particularly, relates to a method and system for image blending for the overlapping region in the surround view.

BACKGROUND

An automotive surround view system assists the driver in driving and parking a vehicle safely. Surround view systems normally consist of at least four cameras mounted around the vehicle. The images captured by the cameras may be processed using geometric alignment and correction so that a composite image is outputted. In current systems, the composite image in the overlapping regions usually suffers from inconsistent and unnatural brightness and color transition across the views due to different illumination, exposure and auto white balance (AWB) of cameras facing different directions. There is usually an obvious suture line and/or brightness and color mismatch at the overlapping region where the image data comes from two adjacent input frames, which causes a bad user experience. Therefore, there is a need for a method and apparatus for image blending for overlapping regions in a surround view.

SUMMARY

According to one aspect of the present disclosure, a surround view system is provided, which comprises a plurality of cameras for capturing images and a processor configured to determine whether a point in a bird's-eye view image obtained from the captured images is located in an overlapping region, and upon the condition that the point is located in the overlapping region, the system retrieves a blending mask corresponding to the coordinate of the point, and determines a new pixel value of the point according to the blending mask and one or more original pixel values of the point.

The coordination system may be predetermined for the surround view or the bird's-eye view image. The origin of the coordinate system may be the center of the bird's-eye view image. The coordination system may be any coordination system, such as, the rectangular coordination system, the polar coordination system, etc.

Further, the blending mask may include blending weights for the original pixel values of the point. The blending weights may be predetermined. The blending mask may be related to an area selected within the overlapping region. The blending mask may further include the coordination of the point.

Further, the selected area may be a triangular area or a sector area within the overlapping region, the vertex of the selected area is the intersection of boundary lines of the overlapping region, and the blending mask of the point is related to the ratio of an angle between a line from the point to the vertex and a boundary line of the selected area passing through the vertex to the angle of the selected area at the vertex upon the condition that the point is within the selected area. The selected area may have other shape, and may be selected in consideration of a balance between the display effect and the computing load. The selection of the area may be also related to the location and the shooting range of the cameras.

Further, the new pixel value of the point in the selected area may be calculated according to the following equation:

$$V = \alpha/\theta * Vn + (1 - \alpha/\theta) * Vm$$

where V refers to the new pixel value of the point in the selected area, n and m refer to two adjacent cameras and the images captured from the two adjacent cameras form the overlapping area, Vn and Vm refer to the original pixel values of the point captured by the camera n and the camera m respectively, $\alpha$ is an angle between a line from the point to the vertex of the selected area and a boundary line of the selected area closer to the camera m in comparison to the camera n, $\theta$ is an angle of the selected area at the vertex.

Further, the blending mask of the point comprises the coordination of the point and weights of the original pixel values of the point, such as, $\alpha/\theta$, a and/or $\theta$.

Further, the new pixel value of the point in the overlapping region and outside the selected area may be related to only the original pixel value of the point obtained from a camera nearest to the point.

According to another aspect of the present disclosure, a method for processing an overlapping region in a surround view system is provided, which comprises determining whether a point in a bird's-eye view image obtained from images captured by more than one camera is located in an overlapping region; and upon the condition that the point is located in the overlapping region, retrieving a blending mask corresponding to the coordinate of the point, and determining a new pixel value of the point according to the blending mask and one or more original pixel values of the point.

According to yet another aspect of the present disclosure, a method for producing a blending mask for an overlapping region of a surround view is provided, which comprises determining the overlapping region of a surround view; building a coordinate system for the surround view, determining weights of original pixel values of a point in the overlapping region according to a coordinate of the point for calculating a new pixel value of the point; and storing a blending mask of the point including the weights and the coordinate of the point.

The method may further comprise selecting an area within the overlapping region, wherein the weights of the original pixel values of the point in the selected area relate to a location of the point in the selected area.

Further, the pixel value may be a RGB channel value. The pixel value may also be other pixel formats, such as, RGBA, YUV, etc.

According to the present disclosure, it is possible to provide a fast blending process at the overlapping regions, which makes the output image more natural, and it is possible to provide a better user experience with low computational complexity.

The significance and benefits of the present disclosure will be clear from the following description of the embodiments. However, it should be understood that those embodiments are merely examples of how the invention can be implemented, and the meanings of the terms used to describe the invention are not limited to the specific ones in which they are used in the description of the embodiments.

Others systems, method, features and advantages of the disclosure will be, or will become, apparent to one with skill in the art upon examination of the following figures and detailed description. It is intended that all such additional systems, methods, features and advantages be included within this description, be within the scope of the disclosure, and be protected by the following claims.

BRIEF DESCRIPTION OF THE DRAWINGS

The disclosure can be better understood with reference to the flowing drawings and description. The components in the drawings are not necessarily to scale, emphasis instead being placed upon illustrating the principles of the disclosure. Moreover, in the figures, like reference numerals designate corresponding parts throughout the different views.

DETAILED DESCRIPTION

Hereinafter, the preferred embodiment of the present invention will be described in more detail with reference to the accompanying drawings. In the following description of the present invention, a detailed description of known functions and configurations incorporated herein will be omitted when it may make the subject matter of the present invention rather unclear.

In the following, an example surround view system is discussed including four cameras. The number of cameras should not be understood as limiting, but merely as being chosen for illustrative purposes, and the number of cameras may vary for different systems and different objects according to the application of the surround view system.

Figure 1:
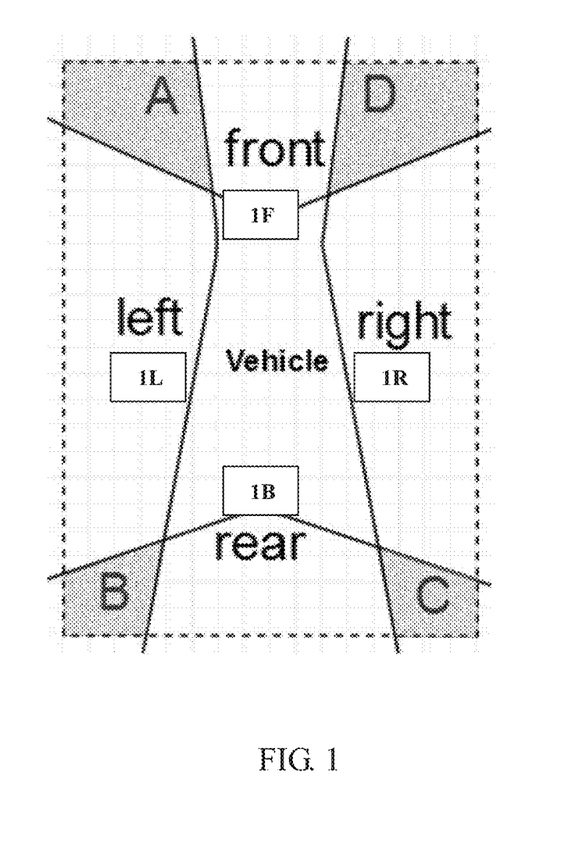
FIG. 1 shows a diagram showing the visible range of the bird's-eye view image around the vehicle according to an embodiment of the present disclosure.

FIG. 1 shows a diagram showing the visible range of the bird's-eye view image around the vehicle according to an embodiment of the present disclosure. As shown in FIG. 1, there is a vehicle at the center position, and four cameras 1F, 1L, 1R, and 1B mounted around it. The positions of the cameras should not be understood as limiting, but merely for illustrative purposes. The front region (including the regions A, D), the left region (including the regions A, B), the rear region (including the regions B, C), the right region (including the regions C, D) respectively represent the visual ranges of the cameras 1F, 1L, 1R, and 1B. Regions A, B, C, D are the overlapping regions. The dashed box represents the visible range of the bird's-eye view image, which should not be understood as limiting, but merely as being chosen for illustrative purposes.

Each point (each may occupy a single pixel) in the overlapping regions A, B, C, D is captured by two adjacent cameras. For example, the region A is captured by both the front camera and the left camera. That is to say, each point has two pixel values. Since the cameras face different directions, the cameras may have different illumination, exposure and/or AWB, and thus the discrepancy between the two pixel values of each point in the overlapping regions may be significant.

For synthesizing the overlapping regions, the present disclosure provides a fast blending method and system for the overlapping regions according to an embodiment of the present disclosure.

Figure 2:
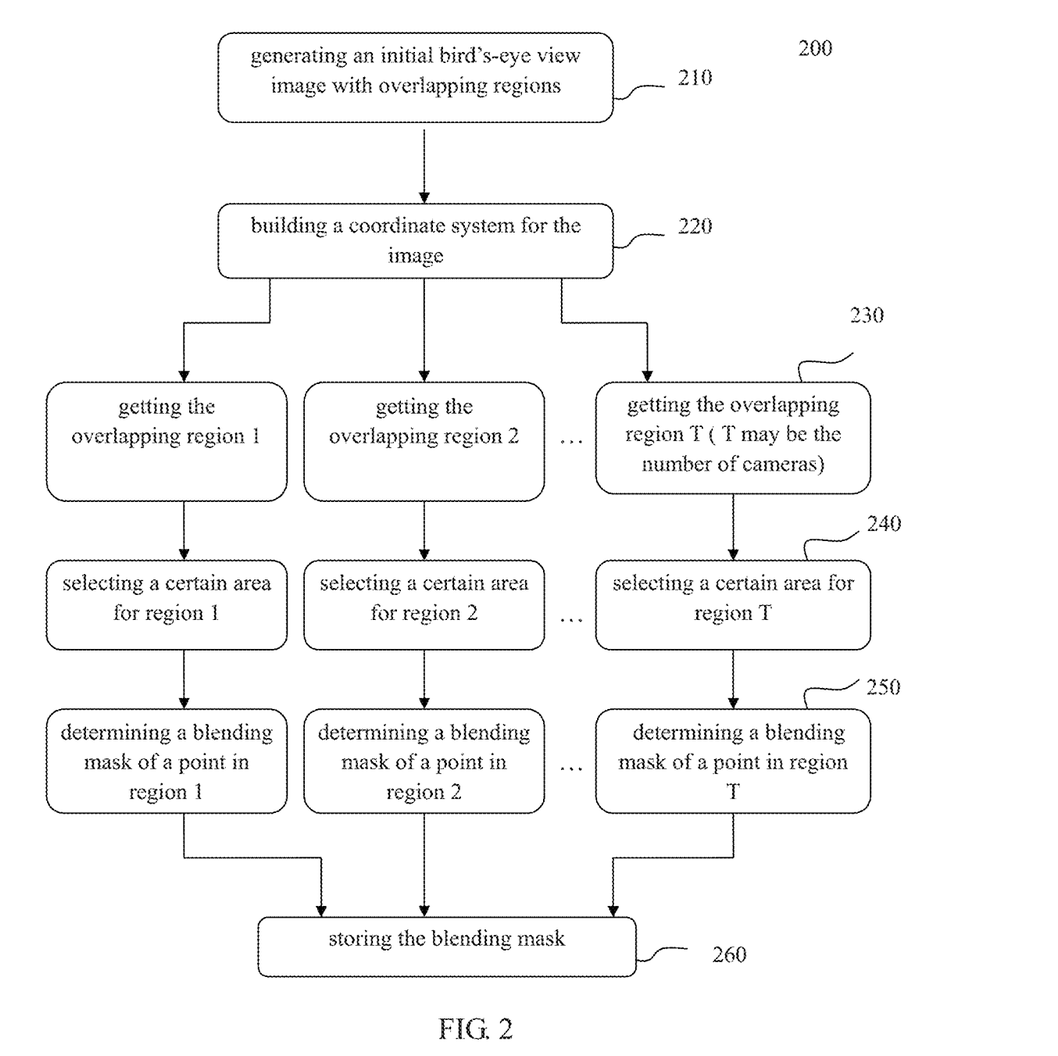
FIG. 2 shows an overall flow diagram for generating a blending mask for an overlapping region according to an embodiment of the present disclosure.

FIG. 2 shows an overall flow diagram of the method for generating a blending mask for the overlapping region according to an embodiment of the present disclosure. The mask is used for synthesizing the overlapping regions of the images captured by surround view cameras and is determined for calculating a new pixel value of each point that has two original pixel values.

As shown in the block 210 in FIG. 2, an initial bird's-eye view image, i.e., a stitched composite image including overlapping regions (e.g., the regions A, B, C, D in the dashed box as shown in FIG. 1) may be generated by geometric alignment and/or other necessary process. The geometric alignment may include any one or more processes selected from the group including fish-eye lens distortion correction, perspective transformation, feature extracting, feature matching, etc. A point in the overlapping region has two pixel values captured by two adjacent cameras.

In order to determine the location of each pixel, a coordinate system is built for the composite image, as shown in the block 220.

In the following, for illustrative purposes, the coordinate system is a rectangular coordinate system. Other coordinate systems may also be selected, such as, a polar coordinate system, which may be determined according to the application of the surround view system.

The origin of the coordinate system may be, but is not limited to, the center of the combined view image, and the unit length of the coordinate system may be the pixel distance. After building a coordinate system, each point in the bird's-eye view image has its own coordinate (e.g., (x, y) for a rectangular coordinate), and each point in the overlapping region has two original pixel values.

In order to determine the blending mask for each point that has two pixel values, the overlapping regions are determined, as shown in the block 230. The overlapping regions are related to the location and the shooting region of each camera. If the location and the shooting region of each camera are known, the overlapping regions may be substantially determined. The overlapping regions may be determined according to the boundary lines of the visual range of the adjacent cameras. For example, the region A may be determined by the boundary lines of the visual range of the camera 1L and the camera 1F. The number of overlapping regions may be equal to the number of cameras given that the shooting regions of each of the two adjacent cameras have an overlapping region.

Next, a certain area (e.g., a triangular or a sector area) is chosen for each overlapping region in the block 240, which will be further described with reference to FIG. 3.

Figure 3:
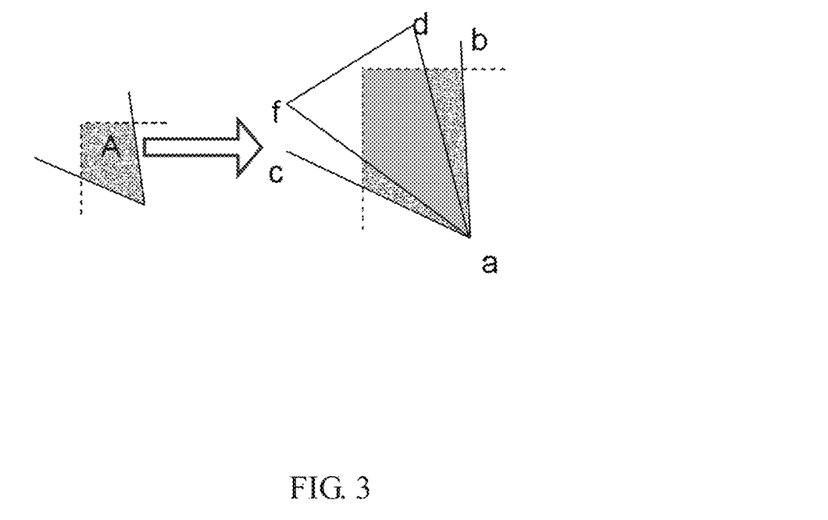
FIG. 3 shows an example of selecting an appropriate triangular area in the overlapping region A as shown in FIG. 1 according to an embodiment of the present disclosure.

FIG. 3 shows an example of selecting an appropriate triangular area in the overlapping region A as shown in FIG. 1. Taking the region A as an example, a triangular area 'afd' is selected from the overlapping region A. The line 'ac' is the boundary line of the front region, and the line 'ab' is the boundary line of the left region, where the point 'b' is a point along the boundary line of the left region, the point 'c' is a point along the boundary line of the front region, the point 'a' is the intersection of the boundary line 'ac' and the boundary line 'ab', and the point 'f' and 'd' are vertices of the selected triangular area. The pixel value of each point in the triangular area is calculated in consideration of two pixel values from two adjacent cameras, and the pixel value of each point in the overlapping region unselected by the triangular area may be equal to the pixel value of that point captured by the camera closest to that point. The computation of the mask will be described with reference to FIG. 4 and FIG. 5 hereinafter.

The selected area may be determined via consideration of a balance between the effect and the computational load of the processing unit, and may be related to the locations and the shooting regions of the cameras. For example, as to the triangular area, the vertex angle between line 'al' and line 'ab' may be determined via consideration of a balance between the effect and the computational load of the processing unit. If the range of the triangular area is too narrow, the pixel color transition is too intense and the effect may not be desired, and if the range of the triangular area is too wide, the computational load would be higher. Typically, the selected area is a part of the overlapping region because selecting an appropriate area may reduce the computational overhead. Nonetheless, it may not be necessary to select an area for determining the mask, or the selected area may be equal to the whole area of the overlapping region.

The triangular area may be replaced by any other shape, such as, sector, or even an irregular shape.

After selecting the triangular area in the block 240, the blending mask for each point in the overlapping region is determined according to the location (i.e., the location in the coordinate) of the point (as shown in the block 250). The calculation of the blending mark is described in details with reference to FIG. 4 and FIG. 5.

Figure 4:
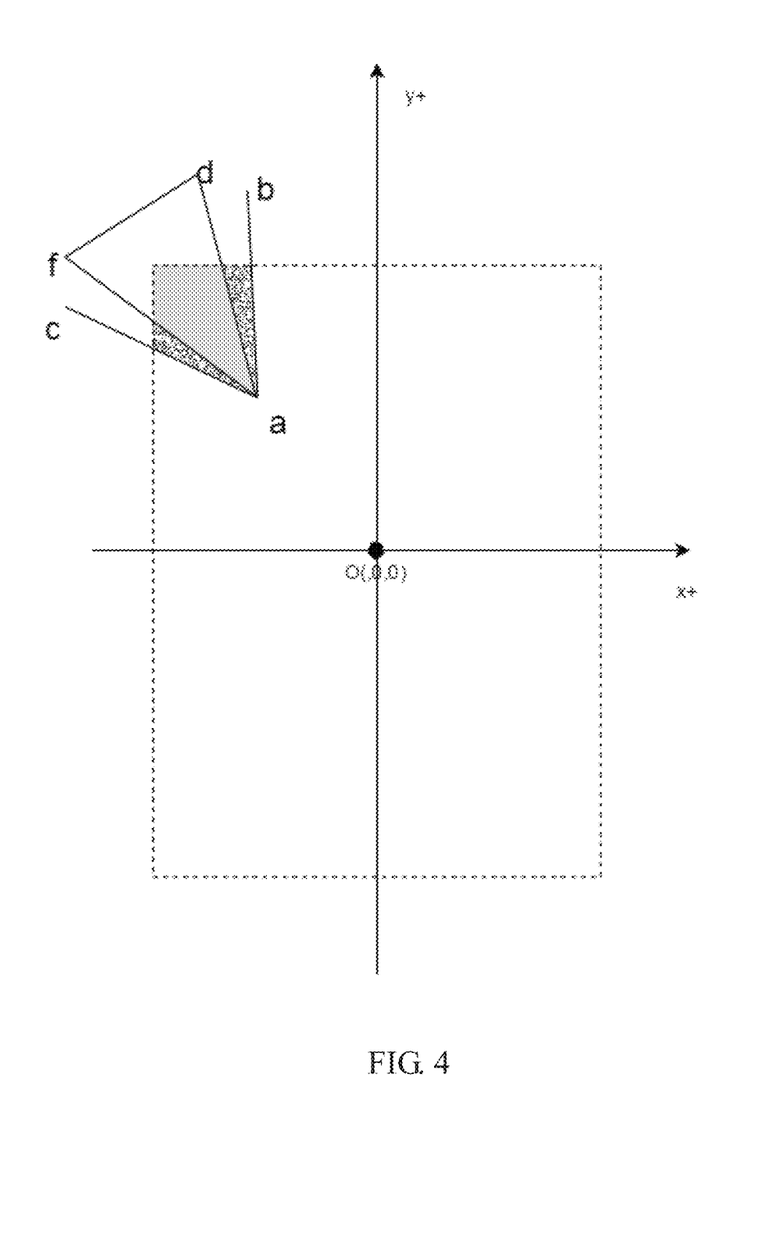
FIG. 4 shows a rectangular coordinate system for identifying each point of the overlapping region A according to an embodiment of the present disclosure.

FIG. 4 shows a rectangular coordinate system for identifying each point in the composite image. The coordinate of each point is relative to the origin O (0, 0), which may be the center point of the dashed box as shown in FIG. 1. Other point may be selected as the origin of the coordination system, which would not affect the result of the synthesized result of the overlapping regions.

The selected triangular area is illustrated by the triangle 'afd'. The line 'ab' is the boundary line of the visual range of the camera 1L, and the line 'ad' is the boundary line of the triangular area. Since the points between the line 'ad' and line 'ab' are closest to the center of the visual range of the camera 1F, the pixel value of the point captured by the camera 1F is used as the pixel value of that point between the line 'ad' and line 'ab'. Therefore, the weight of the original pixel value of the point captured by the camera 1F may be considered as "1", and the weight of the original pixel value of the point captured by the camera 1L may be considered as "0" if the point is between the line 'ad' and line 'ab'. Likewise, the line 'ac' is the boundary line of the visual range of the camera 1F, the line 'af' is the boundary line of the triangular area. Since the pixels between the line 'ac' and line 'af' are closest to the center of the visual range of the camera 1L, the pixel value of the point captured by the camera 1L is used as the pixel value of that point between the line 'ac' and line 'af'. Then, the weight of the original pixel value of the point captured by the camera 1L may be considered as "1", and the weight of the original pixel value of the point captured by the camera 1F may be considered as "0" if the point is between the line 'ac' and line 'af'. That is to say, for a point outside the selected area within the overlapping region, the pixel value of the point is determined only by the value captured by the camera closest to that point.

Figure 5:
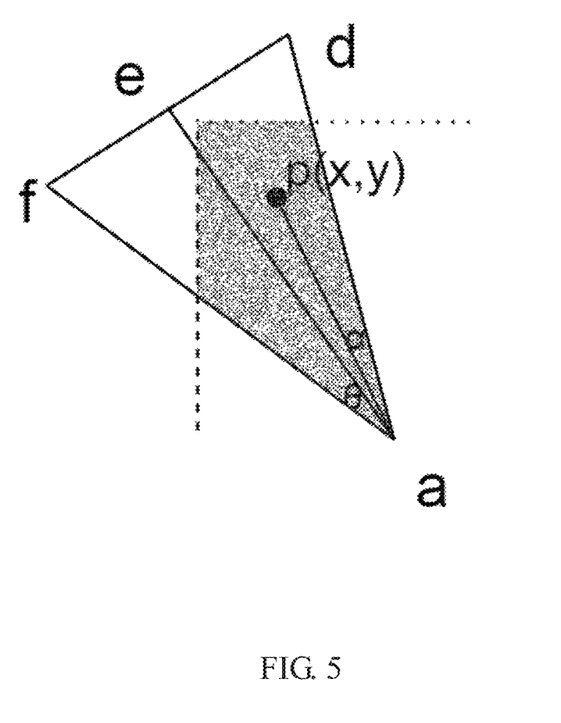
FIG. 5 shows a partially enlarged view of the selected region in the rectangular coordinate system as shown in FIG. 4.

FIG. 5 shows a partially enlarged view of the triangular area as shown in FIG. 4.

As shown in FIG. 5, a point 'p' located in the triangular area has the coordinate (x, y), the symbol $\alpha$ denotes the angle between the line 'ad' and line 'ap', and the symbol $\theta$ denotes the angle between the line 'af' and line 'ad', i.e., the angle of the vertex a of the triangle 'afd'. Those angles may be computed based on the coordinates of the points, such as, by using trigonometric function.

The pixel value of the point may be calculated by blending the pixel values captured by two adjacent cameras according to the following equation:

$$V = \sigma * Vn + (1-\sigma) * Vm \quad \text{(equation 1)}$$

where V refers to the new pixel value of the point in the selected area, n and m refer to two adjacent cameras, m=1, 2, 3, ... T−1, n=m+1, T is the number of the cameras, and the index increases along a counterclockwise direction. Vn and Vm refer to the original pixel values of the point captured by the camera n and the camera m respectively. The weights of $\sigma$ and $(1-\sigma)$ for the two original pixel values Vn and Vm are determined according to the location of p in the selected area.

Let $\sigma = \alpha/\theta$, and then equation 1 would be changed to the flowing equation:

$$V = \alpha/\theta * Vn + (1-\alpha/\theta) * Vm \quad \text{(equation 2)}$$

More specifically, if the images are RGB images, equation 2 would be changed to the flowing equations for the embodiment as shown in FIG. 1:

$$R = \alpha/\theta * R_{1F} + (1-\alpha/\theta) * R_{1L} \quad \text{(equation 3)}$$

$$G = \alpha/\theta * G_{1F} + (1-\alpha/\theta) * G_{1L} \quad \text{(equation 4)}$$

$$B = \alpha/\theta * B_{1F} + (1-\alpha/\theta) * B_{1L} \quad \text{(equation 5)}$$

$R_F$, $G_F$, $B_F$ denote the RGB channel values of the pixel located at the pixel p(x,y) captured by the camera 1L. $R_L$, $G_L$, $B_L$ denote the RGB channel values of the pixel located at the pixel p(x,y) captured by the camera L. For the points located at the line 'ae', their pixel values would be 50% from the frame captured by the camera F and 50% from the frame captured by the camera L based on the aforesaid equations.

The bending mask for each RGB color channel of each pixel in all of the overlapping regions may be calculated by using the aforesaid procedure in view of the location of the pixels.

In the aforesaid equations, the pixel format is RGB. The aforesaid equations may be applied to other pixel formats, such as, RGBA, YUV, etc.

The equations may be modified based on the pixel format and the coordination system. For example, as to the triangular area, the location of the point p and the pixel value of the point p may be calculated based on the polar coordinate system. Then, the points on the line 'ap' would have the same weights for calculating the RGB values, which may reduce the space for storing the blending mask.

The blending mask for calculating the pixel values of the points may be determined by linear or non-linear interpolation algorithms in view of the locations of the points.

The blending mask may be considered as a map between the location of the point and the ratio of the pixel value at this location. Taking the equations (3-5) as an example, after the mask for all the overlapping regions A, B, C, D is calculated, a map between the coordinate (x, y) of the point and the angle $\alpha/\theta$ of the point in the overlapping region may be obtained.

The blending mask including those mapping data is stored in a database, configuration file, or other file stored in the memory, which is included in the system. Optionally, the blending mask may be compressed and/or encrypted for future use and/or transmission. Alternatively, the mapping data may be stored in the remote server and obtained through the network.

The blending mask may be predetermined for a surround view system, or may be generated and/or modified according to the application of the surround view system. For example, as to a surrounding view system deployed in a vehicle, the blending mask may be prestored for the system, and may be determined or updated by the head unit in the vehicle. When the position or the direction of a camera changes or the shooting ranges of a camera changes, the blending mask would be updated for the future application. The blending mask may speed up and simplify the blending procedure of the overlapping region. The surround view system may be mounted in a moveable or immovable object, such as a vehicle.

Figure 6:
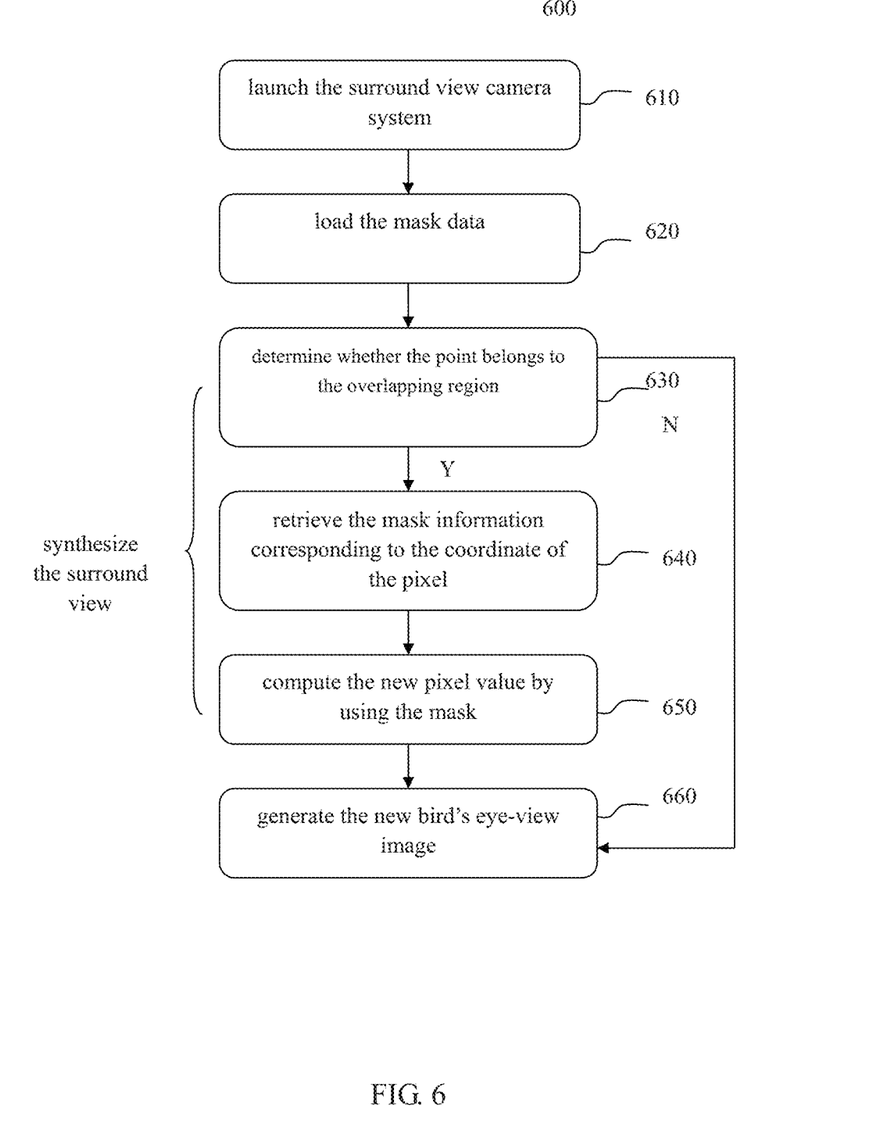
FIG. 6 shows a flow diagram of generating a new bird's-eye view image by using the blending mask.

FIG. 6 shows a flow diagram of generating a new bird's-eye view image by using the blending mask.

As shown in FIG. 6, after launching the surround view system at the block 610, the mask data may be loaded from the database, the configuration file, or other file storing the mask at the block 620, which may not be necessary for the blending processing. The database and/or the configuration file may be stored in the memory, the portable storage device (e.g., the USB storage), or the network server, etc. And following steps for the surround view synthesis may run for every frame.

First, it is determined whether the point belongs to the overlapping region at the block 630. If the pixel is located in the overlapping region, the mask information is retrieved according to the coordinate of the point at the block 640. Further, the new pixel values (e.g., RGB values) are computed for the point at the block 650. If the pixel is located outside the overlapping region, the process proceeds to the block 660. Finally, the new bird's-eye view image is generated after the pixel values of all points in the overlapping regions are determined (see the block 660). The process as shown in FIG. 6 may be performed in a head unit of a vehicle. The head unit may load any of the aforesaid algorithms to calculate the new pixel values for all points in the overlapping regions by using the blending mask.

Figure 7:
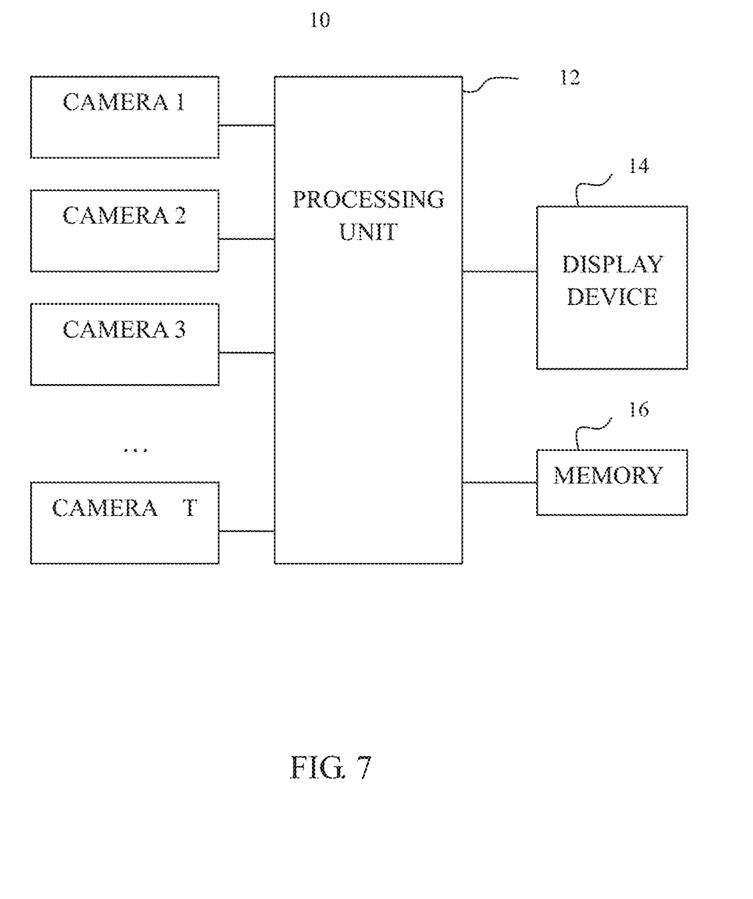
FIG. 7 is a block schematic diagram of the surround view system.

FIG. 7 is a block schematic diagram of the surround view system. As shown in FIG. 7, the surround view system 10 includes cameras 1-T, a processing unit 12, a display device 14, and a memory 16, among others.

The cameras may use the image sensor, such as CCD (charge-coupled device) or CMOS (complementary metal oxide semiconductor), and may be mounted around the vehicle. The processing unit 12 may include the image processing unit, which may perform the surround view synthesis. The processing unit 12 may include software, hardware or some combination thereof. The software in the processing unit 12 may include instructions stored in a memory, such as the memory 16 or an internal memory of the processing unit 12. The processing unit 12 may be implemented as a processor, such as, a central processing unit (CPU), a graphics processing unit (GPU), or the combination thereof.

The blending mask may be retrieved from a database or configuration file, which may be stored in a memory (e.g. the memory 16), the external memory (e.g., the USB storage), and/or network server, etc. The new bird's-eye view may be outputted by the display device 14.

The surround view system 10 may be included in a head unit of a vehicle, and perform any one or more of the methods and/or functions as disclosed above.

It will be understood by persons skilled in the art, that one or more processes or sub-processes described in connection with FIGS. 1-6 may be performed by hardware and/or software. If the process is performed by software, the software may reside in software memory (not shown) in a suitable electronic processing component or system. The software in the memory may include executable instructions for implementing logical functions (that is, "logic" that may be implemented either in digital form such as digital circuitry or source code or in analog form such as analog circuitry or an analog source such as an analog electrical signal), and may selectively be embodied in any computer-readable medium for use by or in connection with an instruction execution system, apparatus, or device. The computer readable medium may selectively be, for example, but is not limited to, an electronic, magnetic, optical, electromagnetic, infrared, or semiconductor system, apparatus or device, such as, a RAM, a ROM, an EPROM, etc.

With regard to the processes, systems, methods, heuristics, etc., described herein, it should be understood that, although the steps of such processes, etc., have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

To clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions herebefore or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

While various embodiments of the disclosure have been described, it will be apparent to those of ordinary skill in the art that many more embodiments and implementations are possible that are within the scope of the disclosure. Accordingly, the disclosure is not to be restricted except in light of the attached claims and their equivalents.

The invention claimed is:

1. A surround view system, comprising:
a plurality of cameras for capturing images;
a processor configured to execute computer readable instructions to:
determine whether a point in a bird's-eye view image obtained from the captured images is located in an overlapping region, wherein the overlapping region is a region shared by fields of view of two adjacent cameras of the plurality of cameras; and
responsive to determining that the point is located in the overlapping region, retrieve a blending mask corresponding to a coordinate of the point, and determine a new pixel value of the point according to the blending mask and one or more original pixel values of the point,
wherein the blending mask is related to an area selected within the overlapping region, and
wherein the selected area is a triangular area or a sector area within the overlapping region, a vertex of the selected area is an intersection of boundary lines of the overlapping region, and the blending mask of the point is related to a ratio of an angle between a line from the point to the vertex and a boundary line of the selected area passing through the vertex to the angle of the selected area at the vertex responsive to determining that the point is within the selected area.

2. The system of claim 1, wherein the blending mask includes blending weights for the original pixel values of the point.

3. The system of claim 1, wherein the new pixel value of the point in the selected area is calculated according to an equation:

$$V = \alpha/\theta * Vn + (1 - \alpha/\theta) * Vm$$

where V refers to the new pixel value of the point in the selected area, n and m refer to the two adjacent cameras of the plurality of cameras, wherein the captured images from the two adjacent cameras form the overlapping region, Vn and Vm refer to the one or more original pixel values of the point captured by the camera n and the camera m respectively, $\alpha$ is an angle between a line from the point to the vertex of the selected area and a boundary line of the selected area closer to the camera m in comparison to the camera n, $\theta$ is an angle of the selected area at the vertex.

4. The system of claim 1, wherein the new pixel value of the point in the overlapping region and outside the selected area is related to only the one or more original pixel values of the point obtained from a camera nearest to the point.

5. The system of claim 1, wherein the processor is further configured to generate a new bird's-eye view image according to the bird's-eye view image and the new pixel value of each point in the overlapping region.

6. The system of claim 5, wherein the processor is further configured to process the captured images by geometric alignment to produce the bird's-eye view image.

7. A method for processing an overlapping region in a surround view system, comprising:
determining whether a point in a bird's-eye view image obtained from images captured by more than one camera is located in an overlapping region, wherein the overlapping region is a region shared by fields of view of two adjacent cameras of the more than one camera; and
responsive to determining that the point is located in the overlapping region, retrieving a blending mask corresponding to a coordinate of the point, and determining a new pixel value of the point according to the blending mask and the one or more original pixel values of the point,
wherein the blending mask is related to an area selected within the overlapping region, and
wherein the selected area is a triangular area or a sector area within the overlapping region, a vertex of the selected area is the intersection of boundary lines of the overlapping region, and the blending mask of the point is related to a ratio of an angle between a line from the point to the vertex and a boundary line of the selected area passing through the vertex to the angle of the selected area at the vertex responsive to determining that the point is within the selected area.

8. The method of claim 7, wherein the blending mask includes blending weights for the one or more original pixel values of the point.

9. The method of claim 7, wherein the new pixel value of the point in the selected area is calculated according to an equation:

$$V = \alpha/\theta * Vn + (1 - \alpha/\theta) * Vm$$

where V refers to the new pixel value of the point in the selected area, n and m refer to the two adjacent cameras of the more than one camera and the captured images from the two adjacent cameras form the overlapping area, Vn and Vm refer to the one or more original pixel values of the point captured by the camera n and the camera m respectively, $\alpha$ is an angle between a line from the point to the vertex of the selected area and a boundary line of the selected area closer to the camera m in comparison to the camera n, $\theta$ is an angle of the selected area at the vertex.

10. The method of claim 9, wherein the new pixel value of the point in the overlapping region and outside the selected area is related to only the original pixel value of the point obtained from a camera nearest to the point.

11. A method for producing a blending mask for an overlapping region of a surround view, comprising:
determining the overlapping region of a surround view, wherein the overlapping region is a region shared by fields of view of two adjacent cameras;
building a coordinate system for the surround view;
determining weights of original pixel values of a point in the overlapping region according to a coordinate of the point for calculating a new pixel value of the point;
storing a blending mask of the point including the weights; and
selecting an area within the overlapping region, wherein the weights of the original pixel values of the point in the selected area relate to a location of the point in the selected area,
wherein the selected area is a triangular area or a sector area within the overlapping region, a vertex of the selected area is an intersection of boundary lines of the overlapping region, and the weights are related to a ratio of an angle between a line from the point to the vertex and a boundary line of the selected area passing through the vertex to an angle of the selected area at the vertex.

12. The method of claim 11, further comprising determining the blending mask of the point within the overlapping region and outside the selected area so that the new pixel value of the point in the overlapping region and outside the selected area is related to only the original pixel value of the point obtained from the camera nearest to the point.

13. The method of claim 11, wherein the pixel value is a RGB channel value.

14. The method of claim 11, wherein the new pixel value of the point in the selected area is calculated according to an equation:

$$V = \alpha/\theta * Vn + (1 - \alpha/\theta) * Vm$$

where V refers to the new pixel value of the point in the selected area, n and m refer to the two adjacent cameras of more than one camera and the captured images from the two adjacent cameras form the overlapping area, Vn and Vm refer to the one or more original pixel values of the point captured by the camera n and the camera m respectively, $\alpha$ is an angle between a line from the point to the vertex of the selected area and a boundary line of the selected area closer to the camera m in comparison to the camera n, $\theta$ is an angle of the selected area at the vertex.

* * * * *